June 10, 1930.  J. B. WEAVER ET AL  1,763,609
PROCESS OF TREATING HYDROCARBON OILS
Filed June 6, 1927
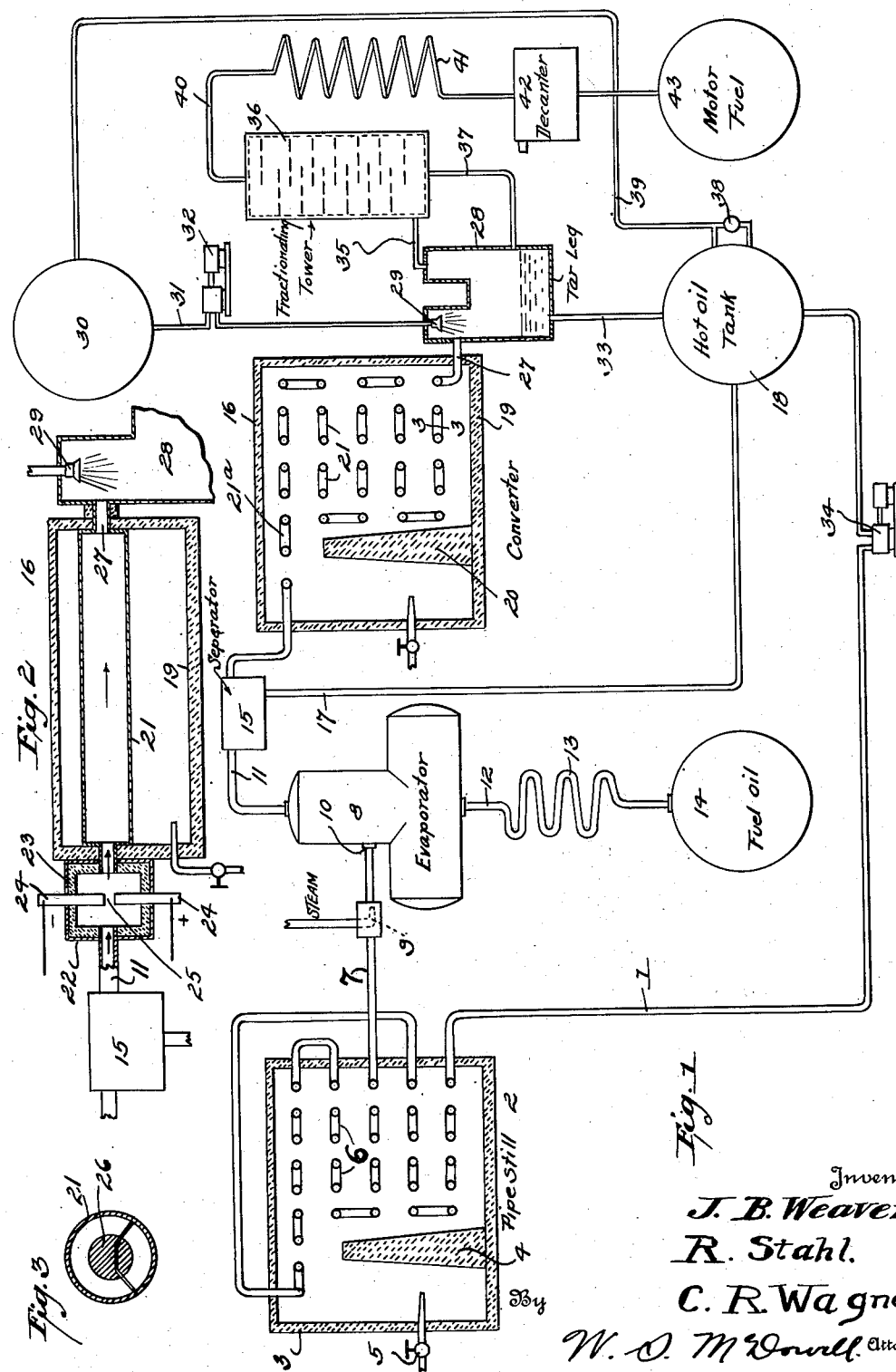
Inventor
J. B. Weaver
R. Stahl.
C. R. Wagner.
By W. O. McDowell Attorney Patented June 10, 1930

1,763,609

UNITED STATES PATENT OFFICE

JOSEPH B. WEAVER AND RODOLPHE STAHL, OF TOLEDO, OHIO, AND CARY R. WAGNER, OF CHICAGO, ILLINOIS; ASSIGNORS TO GYRO PROCESS COMPANY, OF DETROIT, MICHIGAN, A CORPORATION OF MICHIGAN

PROCESS OF TREATING HYDROCARBON OILS

Application filed June 6, 1927. Serial No. 196,884.

This invention relates to an improved process of heat treating hydrocarbon oils for the purpose of converting oils of relatively high boiling point into oils of lower boiling point and adaptable for use as motor fuel.

The invention has for an outstanding object the provision of an oil cracking system, wherein conversion takes place while the oils are maintained in the vapor phase, and wherein the operating temperatures applied to the vapors are so regulated as to substantially prevent the formation or liberation of free carbon during the passage of the oils, either in liquid or vapor form, through the various heating elements and conduits of the system.

Vapor phase methods of cracking oil have been open to the objection that great difficulty is encountered in effecting continuous operation and proper control of the apparatus employed in carrying said system into commercial operation. One of the principal contributory reasons for this is the rapid formation of large quantities of detached, precipitated carbon in the vapor conducting elements of the converter and associated equipment of the apparatus utilized. This free carbon ordinarily collects so freely and in in such relatively large quantities that within a very short time the vapor conducting elements or conduits of the system become plugged or choked with this accumulated carbon deposit. This necessitates frequent suspensions in the operation of the system for the purpose of removing the obstructing material and to prevent the possibility of fires and the destruction of the vapor containing elements. From a practical operating standpoint this has been extremely expensive and has constituted one of the principal causes that have retarded the commercial development and use of the vapor phase method of cracking petroleum oil.

In accordance with the present invention there is provided a method of converting hydrocarbon oils in the vapor phase which consists in regulating the temperatures of the oil immediately before, during and following the conversion operation to prevent substantially the occurrence of temperatures which are conducive to the liberation of free carbon or, if such temperatures are present, to minimize the time of exposure of the oil vapors to such temperatures to such an extent that they will have no injurious effect on the operation of the system.

More specifically, the process consists in initially heating the oil to a vaporous state by primarily subjecting the same to temperatures of approximately 600° F., then substantially instantaneously elevating the temperatures of the vapors to converting temperatures in excess of approximately 1000° F., maintaining the vapors at said latter temperature until desired conversion has been secured, and in then abruptly arresting the conversion reactions by effecting a substantially instantaneous cooling of the products of conversion to a critical temperature less than approximately 600° F., the subsequent treatment of the oil being carried on at temperatures not in excess of said last named temperature, whether or not the oil is in the liquid or vapor phase.

The invention therefore embraces the cardinal principle of substantially eliminating the subjection of the oil for any appreciable time period to temperatures which we have found produce the carbon formation so detrimental to sustained operation, namely from approximately 600 to 1000° F., it being determined that in the operation of the system the more nearly instantaneously the vapors can be caused to traverse this temperature gradient, the more effectual the system becomes in eradicating or eliminating the production of free carbon.

In the accompanying drawings, which form a part of this specification, there has been illustrated apparatus suitable for carrying out the process comprising the present invention, and in which drawings:

Figure 1 is a diagrammatic view showing apparatus employed in accordance with one form of the invention, Figure 2 is a similar view of a slightly modified form, Figure 3 is a transverse sectional view taken through one of the tubes of the converter unit, disclosing the catalyst.

Referring more particularly to the accompanying drawings, and to the embodiment of the invention illustrated in Figure 1, topped hydrocarbon oil or gas oil is forced through a pipe line 1 to a primary heater or vaporizer which in this instance, but not necessarily, is in the form of a pipe still, the latter being indicated in its entirety by the numeral 2. The still may be of any suitable form but in this instance comprises a setting 3, divided transversely by a baffle wall 4 into combustion and tube chambers. Gas or oil burners 5 project into the combustion chamber and operate to produce the necessary degree of heat for raising the temperature of the oil circulating through the tube banks 6 of the still to a temperature of approximately 600° F.

It will be understood, of course, that the stated temperature of 600° F. obtained by the oil and vapors in passing through the pipe still, is merely approximate and is subject to variation when different kinds of oils are being treated. In some instances it is practicable to elevate the temperature of the oil and vapors to approximately 800° F., and therefore the process is not arbitrarily limited to the attainment of a temperature of 600° F., but this is an average temperature and splendid results have been obtained particularly when Pennsylvania and West Virginia oils are utilized.

Leading from the outlet of the pipe still is a pipe line 7, which extends to an evaporator 8. Entering the line 7 between the pipe still and the evaporator is a steam inlet nozzle 9, by means of which superheated steam is introduced into intimate commingled relationship with the oil and vapors prior to the conversion thereof. The heated oil and vapors and the superheated steam are then passed through the line 7 under a pressure varying between 15 and 25 pounds per square inch, and are then discharged into the evaporator as indicated at 10. Owing to the sudden release of the pressure, complete vaporization of the lighter ends takes place, and the vapors pass from the evaporator by way of the pipe line 11, and in this line the vapors are maintained at a temperature of approximately 600 to 800° F.

The heavy end of the oils handled by the evaporator which condense or collect in the bottom of the evaporator are drawn off from the latter by way of an outlet pipe 12 and are further cooled or liquefied by means of a condenser 13 and delivered finally to a storage tank 14 ordinarily in the form of fuel oil. These heavier ends are thus definitely and completely removed from the cyclic operation of the system.

The materials passing through the pipe line 11 are in a vaporous state, and a separator 15 is located in the line 11 for the purpose of trapping any unvaporized or condensed particles and to insure the passage of nothing but dry vapors to the initial passes of the converter which is indicated in its entirety by the numeral 16. The liquid which accumulates in the bottom of the separator is returned by way of a pipe line 17 to the hot oil tank 18 of the apparatus for subsequent recirculation through the pipe still.

The converter disclosed in Figure 1 of the drawing which, as will be shown later, is but one of several types which may be employed consists of a setting 19, divided transversely by a baffle wall 20 into combustion and tube chambers, the construction being very similar to that employed in the construction of the pipe still 2. Arranged within the setting 19 and mainly within the tube chamber thereof is a plurality of vapor conveying tubes or elements 21, and an important feature of the present invention consists in arranging the top pass 21ᵃ of said element in or adjacent to the roof of the setting, so that this top pass of elements will be subjected in part to the intense radiant heat developed within the combustion chamber of the setting. It is highly important in obtaining the ends of the present invention to effect a rapid and substantially instantaneous elevation in the temperatures of the oil vapors immediately prior to or at the time of the subjection of the oil vapors to conversion temperatures. The conversion temperatures employed are in excess of approximately 1000° F., and therefore since the temperature of the vapors in the pipe line 11 varies between 600 to 800° F. it is imperative to effect an abrupt temperature rise in excess of 200° F. If the oil vapors are permitted to remain at temperatures varying between 800 and 1000° F. for any appreciable period of time the formation of free carbon is greatly accelerated and promoted to the detriment of the entire system. If these temperatures could be eliminated entirely the system would operate without the formation of free carbon, but since this is substantially impossible the present invention resides in operating the process so that the rise and fall of the vapors between approximately 600° F. and 1000° F. is as nearly instantaneous as this can be practicably accomplished, and for all intents and purposes the operation of the present invention is such that these temperature differentials can be effected so rapidly that the term instantaneous may be appropriately used to describe the results obtained.

Thus in the form of the invention shown in Figure 1 by locating the initial passes of the conversion elements 21 in the hottest part of the furnace setting, the temperature of the oil vapors after leaving the pipe line 11 and upon entering the converter is suddenly and abruptly raised through the temperature range above set forth, whereby the liberation of free carbon in the vapor passages of the elements 21 is prevented.

Another method of obtaining this result has been depicted in Figure 2, wherein the pipe line 11 leading from the separator 15 enters a casing 22 provided with an internal heating chamber which is lined by a refractory substance 23. Entering the casing 22 are spaced electrodes 24 having their adjacent ends spaced to provide a gap 25. In operation the passage of current from the positive to the negative electrodes creates a spark gap of intense, localized heat, and the velocity of travel of the oil vapors through this intense heating zone is such as to effect the desired elevation in the temperature of the oil vapors in an instantaneous manner from approximately 600° to 1000° F. Other types of heaters may of course be utilized but in all such types the fundamental characteristic must be the substantially instantaneous elevation of the temperature of the oil vapors through the limits specified.

In the converter 16 shown in Figure 1 the converter elements are preferably provided with cores 26 of a catalytic material, preferably in the nature of ferric or ferrous oxid, as specified in the United States patent to Ramage 1,403,194. This catalytic agent is preferably in the form of rods of materially less diameter than the inside diameter of the converter elements, the cores being so arranged that the outer walls or surfaces thereof are spaced from the inner walls of the converter elements. These cores are supported by wire legs or the like, with the end in view of preventing as much as possible the formation of obstructions in the path of the vapors. It has been determined that such obstructions tend to interfere with the velocity of travel of the oil vapors, causing stagnation of a part of them, and the formation of free carbon due to too long an exposure to converting temperatures. It is therefore important that the passes of the converter elements be kept free and unobstructed in order that the vapors will be subjected to conversion temperatures for a definite period of time. With respect to the time element the velocities of the oil vapors in passing through the converter elements are such as to pass or circulate any given body of oil vapor through the converter element in less than two seconds. This results in securing the desired conversion of the vapors but prevents overexposure of the vapors and thereby eliminates the formation of excessive fixed gas or the liberation of free carbon. The velocity of vapors entering the converter is approximately 2000 feet per minute while at the exit it runs close to 5000 feet per minute and may at times run up to 7000 feet per minute.

When a converter of the type shown in Figure 1 is employed the temperature within the setting 19 thereof is sufficiently high to insure the heating of the oil vapors passing through the elements of the converter to temperatures in excess of 1000° F. In the form of the invention disclosed in Figure 2, however, the temperatures of the oil vapors are attained by means of the electric furnace, and then during the passage of the vapors through the single, elongated converter element, it is necessary merely to maintain the latter at a temperature high enough to prevent heat losses by radiation. The construction disclosed in Figure 2 has many advantages in that the mechanical complication of the converter has been materially simplified by the use of the single reaction element or tube, avoiding a multiplicity of tubes used in the converter shown in Figure 1. Again, the cost is considerably less and due to the use of the larger tubes or elements little or no trouble is encountered in maintaining the same in a cleanly condition. Also when a plurality of tube banks or passes are provided it is a difficult matter mechanically to connect the several passes or banks in a vapor tight manner, due to the multiplicity of connections or elbows used at the ends of the tubes and also to inequalities in expansion and contraction on the part of the individual tubes in responding to varying furnace temperatures. With the single reaction chamber, disclosed in Figure 2, these difficulties are largely obviated, although both forms of the invention may be employed in carrying the latter into practice.

The vapors leave the converter and pass through a short insulated exteriorly leading pipe 27, and enter one side of a cooler 28, commonly known in the industry as the tar leg. At the upper end of this cooler there is arranged one or more nozzles 29, which in this instance is adapted to spray the liquid make-up stock or other cooling medium and commingle the same intimately with the incoming vapors entering the cooler from the converter. This cooling oil is led from a source of supply 30 and passes by way of a pipe line 31 and a pump 32 to the nozzle or nozzles 29, where it is introduced in a spray or finely divided mist-like form into the cooler so as to be widely and uniformly distributed with extended surface area through the body of the converted vapors issuing from the pipe 27. Due to the low temperature of this cooling oil and the intimacy and completeness of its surface contact with the heated vapor there is effected through the heat exchange thus set up a sudden and almost instantaneous drop in the temperatures of the vapors from approximately in excess of 1000° F. to a critical temperature of less than approximately 600° F. It will be observed that this operation is substantially the reverse of that previously described when said vapors enter the converter, inasmuch as the sudden cooling of the vapor temperatures and the arresting of the conversion reactions are just as important in the prevention of free carbon formation as is the rapid raising of the temperatures. In both cases it is desirable to minimize to the greatest possible extent the time period when the vapors are passing through between approximately 600° F. and 1000° F. The spray type of cooler has been found to be the most effective in securing these ends, although of course the invention is not limited to a cooler of this specific type but embraces any medium whereby the necessary abrupt and substantially instantaneous decrease in temperature can be secured.

In this process of cooling the oil vapors the interchange of heat effected by bringing the fresh cold oil of, for example, the make-up stock into contact with the converter vapors, has the beneficial action of raising the temperatures of such make-up stock to effect heat economy in the operation of the pipe still. Thus the liquefied stock passes from the bottom of the cooler or tar leg 28 by way of a pipe 33 to the hot oil tank 18, and is then circulated by means of a pump 34 back into the line 1 leading to the pipe still.

The vapors remaining incondensed in the tar leg are led from the unit 28 by way of a pipe 35 into a fractionating tower 36. The vapors arise within the tower 36 and the heavier or liquefiable portions thereof drop to the bottom of said tower and are led away by means of a pipe 37 to the bottom of the cooler 28 and may then be recirculated through the system. A liquid level controller 38 is used in connection with the hot oil tank and is adapted to return excess liquid by way of the the pipe line 39 back to the source of supply 30.

It will be understood that any suitable type of fractionating equipment, separating or purifying apparatus may be used for handling the vapors following release thereof from the cooler 28. A single fractionating tower 36 has been shown in this instance, although it will be understood that any number of these towers may be used to produce the desired number of cuts or fractions of differing boiling points, without affecting the features of the invention as above related. For present purposes, however, the vapors leaving the fractionating tower pass through a pipe line 40, leading to a condenser 41 and are then delivered to a decanter or separator 42, which separates the fixed gases from the water and the hydrocarbon distillate. This distillate is then delivered to a storage tank 43.

While the invention has been described as employing a catalyst such as ferrous oxide within the elements of the converter, it will be understood that other suitable materials may be employed if desired, or the catalyst may be eliminated entirely, particularly in the form of the invention disclosed in Figure 2.

In view of the foregoing it will be seen that the present invention provides an improved method of converting hydrocarbon oils by the vapor phase method of operation, wherein the vapors are subjected to such improved temperature conditions or regulation that little or no free carbon will be liberated, at least not to an extent which would have any material effect on the operation of the system. Of course, these results can be obtained by the employment of other and different types of apparatus from that specifically described above, and therefore the invention is directed broadly to the attainment of the temperature conditions specified rather than to any specific structural method of obtaining such results.

What is claimed is:

1. The process of converting hydrocarbon oil which comprises heating the oil to temperatures sufficient to convert the same from its normally liquid to a dry vapor state but without cracking, then abruptly and substantially instantly raising the temperature of the oil vapors to cracking temperatures in excess of approximately 1000° F., and immediately upon completing the cracking in the vapor phase abruptly arresting the cracking reactions by instantaneously cooling the cracked products to a critical temperature less than approximately 600° F. to substantially eliminate the formation of free carbon.

2. The process of treating hydrocarbon oil which comprises subjecting the oil to vaporizing temperatures not in excess of 800° F. to reduce the oil prior to conversion to a dry vapor state, then abruptly and substantially instantaneously raising the temperature of the oil vapors to temperatures in excess of approximately 1000° F., and immediately upon completing the conversion in the vapor phase abruptly arresting the conversion reactions by effecting a rapid and substantially instantaneous cooling of the products of conversion to a critical temperature less than approximately 600° F.

3. The process of converting hydrocarbon oil, which comprises heating the oil to temperatures sufficient to reduce the same to a substantially dry vapor state but without appreciably cracking the same, then abruptly and substantially instantaneously raising the temperature of the oil vapors to cracking temperatures in excess of approximately 1000° F. by passing the dry oil vapors through a tubular converter having the inlet portion thereof subjected to the action of radiant heat, continuing to heat the oil vapors for a period of time not in excess of two seconds, and then abruptly and substantially instantaneously lowering the temperature of the oil vapors from a point in excess of 1000° F. to a temperature not in excess of 600° F.

4. The process of converting high boiling-point hydrocarbons into those of lower boiling point, which comprises heating the oil initially introduced into the process to a temperature sufficiently high to convert the same from its normally liquid to a substantially dry vapor state, then abruptly and substantially instantaneously raising the temperature of the oil vapors to converting temperatures in excess of approximately 1000 F., and maintaining the vapors at such latter temperature for a period of time not in excess of two seconds, and then abruptly and substantially instantaneously arresting cracking reactions by lowering the temperature of the oil vapors to a critical temperature less than approximately 600° F.

5. The process of treating hydrocarbon oil, which comprises converting the oil in the vapor phase at a temperature in excess of approximately 1000° F., immediately upon completing the desired conversion of the oil in the vapor phase abruptly arresting the conversion reactions by passing the heated vapors at the temperature specified through a body of cooling oil in the form of a finely divided spray, said spray serving to reduce the temperature of the oil vapors substantially instantaneously to a critical temperature of less than approximately 600° F., and then re-circulating the oils not in vaporous form at said last named temperature through the system, the excess quantity of cooling oil employed in said cooling operation being returned to the source of supply.

6. The process of converting high boiling oils into lower boiling oils, which consists in subjecting such high boiling oils to temperatures sufficiently high to effect vaporization thereof without any appreciable conversion, removing from the oils under treatment those fractions which are not vaporizable without decomposition, then abruptly and substantially instantaneously raising the temperature of the oil vapors through the employment of radiant heat to conversion temperatures in excess of approximately 1000° F., and then completing the conversion operation while the vapors are maintained at temperatures not substantially lower than said last named temperature.

7. The process of converting hydrocarbon oils of relatively high boiling points into oils of lower boiling points, which consists in subjecting such high boiling point oils to temperatures sufficiently high to effect vaporization thereof without appreciable cracking, removing from said oils the fractions thereof which are not vaporizable without molecular decomposition, then abruptly and substantially instantaneously raising the temperature of the remaining oil vapors to conversion temperatures in excess of approximately 1000° F., maintaining said vapors at said last named temperature for a period of time to secure a desired degree of conversion and then arresting said conversion operation by lowering the temperature of said vapors substantially instantaneously from a conversion temperature in excess of 1000° F. to a non-converting temperature not substantially in excess of 600° F.

8. In the manufacture of low boiling oils from higher boiling oils, the process which comprises heating such higher boiling oils to a temperature of vaporization without substantially cracking the same, then removing from said oils fractions which are not vaporizable without decomposition, said last named fractions being permanently removed from the system, then passing the remaining oil vapors through a heating zone wherein the temperature thereof by the utilization of radiant heat is abruptly and substantially instantaneously raised to a converting temperature in excess of approximately 1000° F., then permitting the conversion reactions to occur while said vapors are maintained at said last named temperature and under a pressure not substantially in excess of 25 pounds per square inch.

9. In the manufacture of lower boiling oils from higher boiling oils, the process which comprises heating to a vaporizing temperature such a higher boiling oil without substantial cracking thereof, then separating said oil and vapors to remove therefrom such oils which are not vaporizable, passing the remaining vapors through a hot tubular cracking zone wherein the vapors by means of radiant heat are abruptly and substantially instantaneously heated to a conversion temperature in excess of 1000° F., the vapors being passed through said conversion zone at such a rate that only a portion of the vapors are cracked therein, passing the emerging vapors through a cooler and in such cooler bringing the vapors into intimate contact with high boiling oils to abruptly and substantially instantaneously arrest the conversion reactions by lowering the temperature of said vapors to a non-converting temperature not substantially in excess of 600° F., returning the mixture of high boiling oils and condensate from the cooler to the initial heating and vaporizing zone to serve for the production of vapors for the cracking zone, and condensing the vapors passing from said cooler to give a condensate of desired low boiling oils.

10. In the manufacture of low boiling oils from higher boiling oils, the process which comprises vaporizing such higher boiling oils, passing the vapors through a hot tubular cracking zone wherein the temperature of the vapors is raised abruptly and substantially instantaneously by exposure to radiant heat to a conversion temperature in excess of 1000° F., passing the emerging vapors through a cooler and in such a cooler bringing the vapors into intimate contact with a body of cooling oil, returning the mixture of cooling oil and condensed high boiling oil from the cooler to the initial vaporizing zone to serve for the production of vapors for the cracking zone, condensing the residual vapors passing from the cooler to give a condensate of the desired lower boiling oils, and in permanently removing from the system ahead of said hot tubular cracking zone those fractions of the oils under treatment which are not vaporizable without decomposition.

11. The process of continuously converting heavy hydrocarbon oil into lighter oil, which consists in passing a moving stream of such heavy oil through an elongated vaporizing zone of restricted cross-section, therein heating the heavy oil to vaporizing temperatures, then passing the mixture of oils and vapors through an enlarged separating zone and removing from said zone the heavy residue unsuitable for further heat treatment, passing the vaporized oil from said separating zone through a conversion zone, wherein such vaporized oil is subjected first to intense radiant heat to abruptly and substantially instantaneously raise the temperature thereof to converting temperatures in excess of approximately 1000° F., then completing the conversion operation while the oil vapors are maintained at temperatures not lower than said last named temperature, then abruptly and substantially instantaneously cooling the vapor leaving the converting zone from said converting temperatures to a critical temperature not in excess of 600° F. by bringing relatively cool fresh oil into direct contact with the vapors leaving the converting zone, fractionating the mixture of vapors thus produced to secure a liquid fraction free from low boiling point constituents, and then passing said latter fraction to the vaporizing zone.

12. The process of continuously converting heavy hydrocarbon oil into lighter oil, which consists in passing a moving stream of such heavy oil through an elongated vaporizing zone of restricted cross-section and therein heating the oil to vaporizing temperatures, passing the mixture of oils and vapors from said vaporizing zone through an enlarged separating zone and removing from said latter zone heavy residues unsuitable for further heat treatment, passing the vaporized oil from said separating zone through an elongated conversion zone of restricted cross-section wherein said vaporized oil is subjected first to the action of intense radiant heat to abruptly and substantially instantaneously raise the temperature thereof to converting temperatures in excess of approximately 1000° F., then completing the conversion operation while the oil vapors are passing through said conversion zone and maintained at temperatures not lower than said last named temperature, then abruptly and substantially instantaneously cooling the vapors leaving the conversion zone from the converting temperatures to a critical temperature not in excess of 600° F., fractionating the mixture of vapors thus produced to secure a liquid fraction free from low boiling point constituents, and then passing said fraction to the vaporizing zone.

13. The process of continuously converting heavy hydrocarbon oil into lighter oil, which consists in passing the moving stream of such heavy oil through an elongated vaporizing zone of restricted cross-section, and heating the oil passing through said zone to vaporizing temperatures, then passing the mixture of oils and vapors from said vaporizing zone through an enlarged separating zone and removing from said latter zone heavy residues unsuitable for further heat treatment, passing the vaporized oil from said separating zone through an elongated conversion zone of restricted cross-section wherein said vaporized oil is subjected first to intense radiant heat to abruptly and substantially instantaneously raise the temperature thereof to converting temperatures in excess of approximately 1000° F., completing the conversion operation while the oil vapors are passing through said conversion zone and maintained at temperatures not lower than said last named temperature, and then abruptly and substantially instantaneously cooling the vapors leaving the conversion zone from the converting temperature to a critical temperature not in excess of 600° F. by bringing relatively cool fresh oil into direct contact with the vapors leaving the converting zone.

14. The process of continuously converting heavy hydrocarbon oil into lighter oil, which consists in passing the moving stream of such heavy oil through an elongated vaporizing zone of restricted cross-section, and heating the oil passing through said zone to vaporizing temperatures, then passing the mixture of oils and vapors from said vaporizing zone through an enlarged separating zone and removing from said latter zone heavy residues unsuitable for further heat treatment, passing the vaporized oil from said separating zone through an elongated conversion zone of restricted cross-section wherein said vaporized oil is subjected first to intense radiant heat to abruptly and substantially instantaneously raise the temperature thereof to converting temperatures in excess of approximately 1000° F., completing the conversion operation while the oil vapors are passing through said conversion zone and maintained at temperatures not lower than said last named temperature, and then abruptly and substantially instantaneously cooling the vapors leaving the conversion zone from the converting temperature to a critical temperature not in excess of 600° F.

15. The process of continuously converting heavy hydrocarbon oil into lighter oil, which consists in passing the moving stream of such heavy oil through an elongated vaporizing zone of restricted cross-section and heating the oil passing through said zone to vaporizing temperatures, then passing the mixture of oils and vapors from said vaporizing zone through an enlarged separating zone and removing from said latter zone heavy residues unsuitable for further heat treatment, passing the vaporized oil from said separating zone through an elongated conversion zone of restricted cross-section wherein said vaporized oil is subjected first to intense radiant heat to abruptly and substantially instantaneously raise the temperature thereof to converting temperatures in excess of approximately 1000° F., and completing the conversion operation while the oil vapors are passing through said conversion zone and maintained at temperatures not lower than said last named temperature.

16. The process of producing a lighter oil from a heavier oil, which consists in vaporizing the heavier oil, in passing such oil vapor through a conversion zone in which the oil vapor is first subjected to intense radiant heat to cause it to be heated abruptly and substantially instantaneously to a converting temperature in excess of 1000° F., and maintaining the oil vapor at such converting temperature for a period of time not in excess of 2 seconds.

17. The process of producing lighter oil from a heavier oil, which consists in vaporizing the heavier oil, in passing such oil vapor through a conversion zone in which the oil vapor is first subjected to intense radiant heat to cause it to be heated abruptly and substantially instantaneously to a converting temperature in excess of 1000° F., maintaining the oil vapor at such converting temperature for a period of time not in excess of 2 seconds, and then abruptly and substantially instantaneously cooling the vapors leaving the converting zone from the converting temperature to a critical temperature not in excess of 600° F.

18. The process of producing lighter oil from a heavier oil, which consists in vaporizing the heavier oil, in passing such oil vapor through an elongated conversion zone of restricted cross-section in which the oil vapor is first subjected to intense radiant heat to cause it to be heated abruptly and substantially instantaneously to a converting temperature in excess of 1000° F., maintaining the oil vapor at such converting temperatures for a period of time not in excess of 2 seconds, and then abruptly and substantially instantaneously cooling the vapors leaving the conversion zone from the converting temperatures to critical temperatures not in excess of 600° F. by bringing relatively cool fresh oil into direct contact with the vapors leaving the conversion zone.

19. The process of producing lighter oil from a heavier oil, which consists in vaporizing the heavier oil, in passing such oil vapor through an elongated conversion zone of restricted cross-section, in which the oil vapors are raised to conversion temperatures in excess of 1000° F., maintaining the oil vapors at such conversion temperature for a period of time not in excess of 2 seconds, and then abruptly and substantially instantaneously cooling the vapors leaving the conversion zone from converting temperatures to critical temperatures not in excess of 600° F.

20. The process of producing lighter oil from a heavier oil, which consists in vaporizing the heavier oil, in passing such oil vapor through an elongated conversion zone of restricted cross-section, in which the oil vapors are raised to conversion temperatures in excess of 1000° F., maintaining the oil vapors at such conversion temperature for a period of time not in excess of 2 seconds, and then abruptly and substantially instantaneously cooling the vapors leaving the conversion zone from converting temperatures to critical temperatures not in excess of 600° F. by bringing relatively cool fresh oil into direct contact with the vapors leaving the conversion zone.

21. The process of treating hydrocarbon oil, which comprises converting the oil in the vapor phase at a temperature in excess of approximately 1000° F., immediately upon completing the desired conversion of the oil in the vapor phase abruptly arresting the conversion reactions by passing the heated vapors at the temperature specified through a body of fresh oil said fresh oil serving to reduce the temperature of the oil vapors substantially instantaneously to a critical temperature of less than approximately 600° F. and thereby providing vaporous and liquid fractions, fractionating the vapors thus produced to secure a liquid fraction free from low boiling point constitutents, merging this liquid fraction with that produced by said abrupt cooling step utilizing a portion of said merged liquid fractions of high boiling range as a vaporizing and cracking stock, and diverting the balance to the source of fresh oil supply.

In testimony whereof we affix our signatures.

JOSEPH B. WEAVER.
RODOLPHE STAHL.
CARY R. WAGNER.